United States Patent
Lee et al.

(10) Patent No.: US 7,889,459 B2
(45) Date of Patent: Feb. 15, 2011

(54) HDD AND HDD STACK ASSEMBLY WITH HEAD SUSPENSION HAVING MULTIPLE COMBINATION PARTS AND SPACER

(75) Inventors: Haeng-soo Lee, Suwon-si (KR); Woo-sung Kim, Gangnam-gu (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 840 days.

(21) Appl. No.: 11/776,630

(22) Filed: Jul. 12, 2007

(65) Prior Publication Data
US 2008/0013205 A1 Jan. 17, 2008

(30) Foreign Application Priority Data
Jul. 13, 2006 (KR) ...................... 10-2006-0065869

(51) Int. Cl.
*G11B 5/48* (2006.01)
(52) U.S. Cl. ............... 360/244.5; 360/244.2; 360/265.9
(58) Field of Classification Search .............. 360/244.2, 360/244.5, 265.9
See application file for complete search history.

(56) References Cited

U.S. PATENT DOCUMENTS

| | | | |
|---|---|---|---|
| 5,999,369 A * | 12/1999 | Shimizu et al. .......... 360/244.5 |
| 6,154,952 A | 12/2000 | Tangren | |
| 6,233,124 B1 | 5/2001 | Budde et al. | |
| 6,407,889 B1 * | 6/2002 | Khan et al. .................. 360/255 |
| 6,522,050 B2 * | 2/2003 | Sivadasan et al. ........... 310/328 |
| 7,502,203 B1 * | 3/2009 | McCaslin et al. ........ 360/244.5 |
| 7,595,964 B2 * | 9/2009 | Oh et al. .................. 360/294.1 |
| 7,606,000 B1 * | 10/2009 | Brandts et al. ........... 360/244.8 |
| 2002/0131211 A1 | 9/2002 | Nishida et al. | |
| 2004/0190203 A1 | 9/2004 | Albrecht et al. | |
| 2005/0063095 A1 | 3/2005 | Matsumura et al. | |

FOREIGN PATENT DOCUMENTS

| | | |
|---|---|---|
| EP | 1560202 A2 | 8/2005 |
| JP | 03130970 | 6/1991 |
| JP | 10097773 | 4/1998 |
| JP | 2002056515 | 2/2002 |

* cited by examiner

*Primary Examiner*—Jefferson Evans
(74) *Attorney, Agent, or Firm*—Volentine & Whitt, PLLC

(57) ABSTRACT

A head stack assembly (HSA) for a hard disk drive (HDD) comprises a swing arm rotatably coupled to a base member of the HDD, a connection plate coupled to an edge part of the swing arm, a head suspension component attached to the connection plate, and a head slider comprising a magnetic read/write head attached to an edge part of the head suspension component.

10 Claims, 8 Drawing Sheets

HDD AND HDD STACK ASSEMBLY WITH HEAD SUSPENSION HAVING MULTIPLE COMBINATION PARTS AND SPACER

CROSS-REFERENCE TO RELATED APPLICATIONS

This application claims the priority of Korean Patent Application No. 10-2006-0065869, filed on Jul. 13, 2006, the disclosure of which is hereby incorporated by reference in its entirety.

BACKGROUND OF THE INVENTION

1. Field of the Invention

Embodiments of the invention relate generally to hard disk drives (HDDs). More particularly, embodiments of the invention relate to head stack assemblies (HSAS) designed to reduce the amount of off-track displacement of magnetic heads in the HDDs.

2. Description of Related Art

A HDD is a memory device used to provide mass data storage for electronic devices such as personal computers (PCs), MP3 players, mobile phones, and so on. A HDD uses a magnetic head to read and write data on a disk comprising a rotating platter having a magnetic surface. The head is embedded in a head slider, and when the HDD operates, the head slider floats a predetermined distance above the disk. A head stack assembly (HSA) is attached to the head slider to support and move the head slider.

During operation of the HDD, an actuator arm moves the head slider between tracks of the disk containing storage elements. In order to properly read or write data in the storage elements of a selected track, the head slider must be precisely aligned with the track. Unfortunately, however, the HSA or the disk may vibrate due to external disturbances, or due to the operation of a spindle motor of the HDD. Such vibrations may cause the head slider and the associated magnetic head to deviate from a desired position on the selected track. Such deviation is commonly referred to as "off-track displacement" of the head slider or magnetic head.

Figure 1:
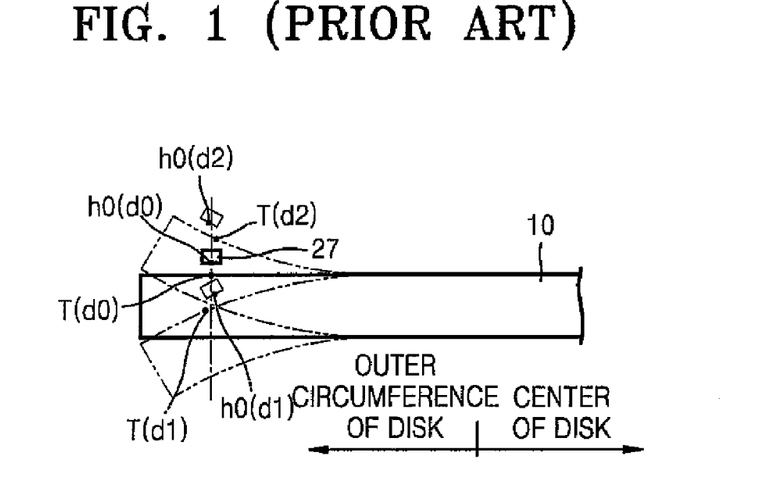
FIG. 1 is a conceptual diagram illustrating off-track displacement of a magnetic head of a HDD due to disk vibrations.

FIG. 1 is a conceptual diagram used to illustrate off-track displacement of a magnetic head due to mechanical vibrations of a disk platter. The view shown in FIG. 1 is a side-view of the disk platter.

Referring to FIG. 1, a side view of a disk platter 10 in a HDD is shown as a solid box-like shape. Positions of platter 10 during vibrations or other movements are shown as dotted extensions of the solid box-like shape. A head slider 27 of the HDD is illustrated as a small box, and a magnetic head h0 of the HDD is illustrated as a dot on head slider 27.

The position of a track including storage elements to be read by magnetic head h0 is illustrated by a dot on platter 10. In particular, where platter 10 is in a stationary position, the track has a position T(d0); where platter 10 moves upward, the track assumes a position T(d2); and where platter 10 moves downward, the track assumes a position T(d1).

In addition, head slider 27 and magnetic head h0 also assume different positions when platter 10 moves. In particular, where platter 10 is in a stationary position, magnetic head h0 maintains a position h0(d0); where platter 10 moves upward, magnetic head h0 assumes a position h0(d2); and, where platter 10 moves down, magnetic head h0 assumes a position h0(d1).

As illustrated by a vertical line in FIG. 1, the position of magnetic head h0 tends to become misaligned with the track when platter 10 moves. In other words, the movement of platter 10 due to mechanical vibrations or other types of motion tends to cause off-track displacement of head slider 27 and magnetic head h0.

A variety of techniques have been developed in efforts to reduce off-track displacement of head sliders and magnetic heads in HDDs due to mechanical vibrations such as those illustrated in FIG. 1. For example, U.S. Pat. Nos. 6,920,018 and 6,958,879 each disclose a HSA designed to reduce off-track displacement due to disk vibration. In the HDDs disclosed in U.S. Pat. Nos. 6,920,018 and 6,958,879, off-track displacement due to disk vibration is reduced by moving a head slider toward the outer circumference of the platter when the HSA moves downward, and moving the head slider toward the center of the platter when the HSA moves upward.

Although the HSAs disclosed in U.S. Pat. Nos. 6,920,018 and 6,958,879 are capable of reducing off-track displacement caused by mechanical vibrations, the HSAs are not as effective at reducing off-track displacement caused by arm bending of the HSAs. The term "arm bending" here refers generally to movements of extended portions of the HSA due to forces such as torque. For instance, a head suspension component or a swing arm of a HSA may move up and down in response to torque induced by lift forces generated by air flow, and torque induced by downward gravitational pull on the HSA and/or externally induced mechanical vibrations.

Figure 2:
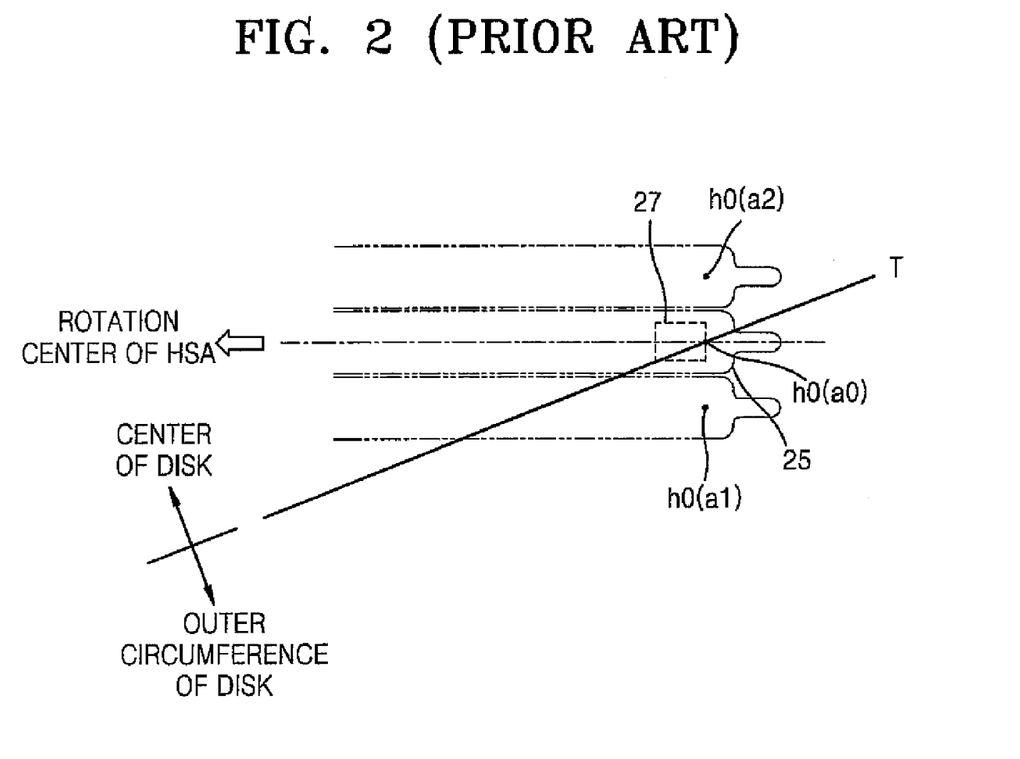
FIG. 2 is a conceptual diagram illustrating off-track displacement of a magnetic head of a HDD due to arm bending.

FIG. 2 is a conceptual diagram used to illustrate off-track displacement of magnetic head h0 shown in FIG. 1 due to arm bending of a HSA including head suspension component 25 and head slider 27. In contrast to FIG. 1, the view shown in FIG. 2 is a top-view of disk platter 10. Accordingly, in FIG. 2, a solid line labeled "T" represents a single track of disk platter 10.

Referring to FIG. 2, where arm bending occurs, head suspension component 25 moves up and down along with head slider 27 and head h0. Accordingly, magnetic head h0 attached to head slider 27 is displaced relative to track "T".

More particularly, where head suspension component 25 moves upwards, magnetic head h0 moves from a resting position h0(a0) to a position h0(a1) towards the outer circumference of platter 10. On the other hand, where head suspension component 25 moves downwards, magnetic head h0 moves from resting position h0(a0) to a position h0(a2) towards the center of platter 10.

Because conventional techniques fail to adequately address off-track displacement caused by arm bending, the performance of the HDD may suffer.

SUMMARY OF THE INVENTION

Accordingly, selected embodiments of the invention provide HSAs adapted to simultaneously reduce off-track displacement due to disk vibration and off-track displacement due to arm bending. In addition, selected embodiments of the invention provide HDDs including such a HSA.

According to one embodiment of the invention, A head stack assembly (HSA) for a hard disk drive (HDD), comprises a swing arm rotatably coupled to a base member of the HDD, a connection plate coupled to an edge part of the swing arm, wherein the connection plate is biased towards the center of a disk platter of the HDD relative to the edge part of the swing arm, a head suspension component comprising first and second combination parts attached to the connection plate, wherein the first combination part is closer to the center of the disk platter than the second combination part and is attached to the connection plate in a first position, and the second combination part is attached to the connection plate in a second position higher than the first position, and a head slider comprising a magnetic read/write head and attached to an edge part of the head suspension component.

According to another embodiment of the invention, a head stack assembly (HSA) comprises a swing arm rotatably coupled to a base member of a hard disk drive (HDD), a connection plate coupled to an edge part of the swing arm, a head suspension component comprising first and second combination parts attached to the connection plate, wherein the first combination part is closer to the center of a disk platter of the HDD than the second combination part and is attached to the connection plate in a first position, and the second combination part is attached to the connection plate in a second position higher than the first position, and a head slider comprising a magnetic read/write head and attached to an edge part of the head suspension component.

BRIEF DESCRIPTION OF THE DRAWINGS

Embodiments of the invention are described below with reference to the corresponding drawings. In the drawings, like reference numerals are used to refer to like features. In the drawings.

DESCRIPTION OF EXEMPLARY EMBODIMENTS

Exemplary embodiments of the invention are described below with reference to the accompanying drawings. These embodiments are presented as teaching examples while the scope of the invention is defined by the claims that follow.

Figure 3:
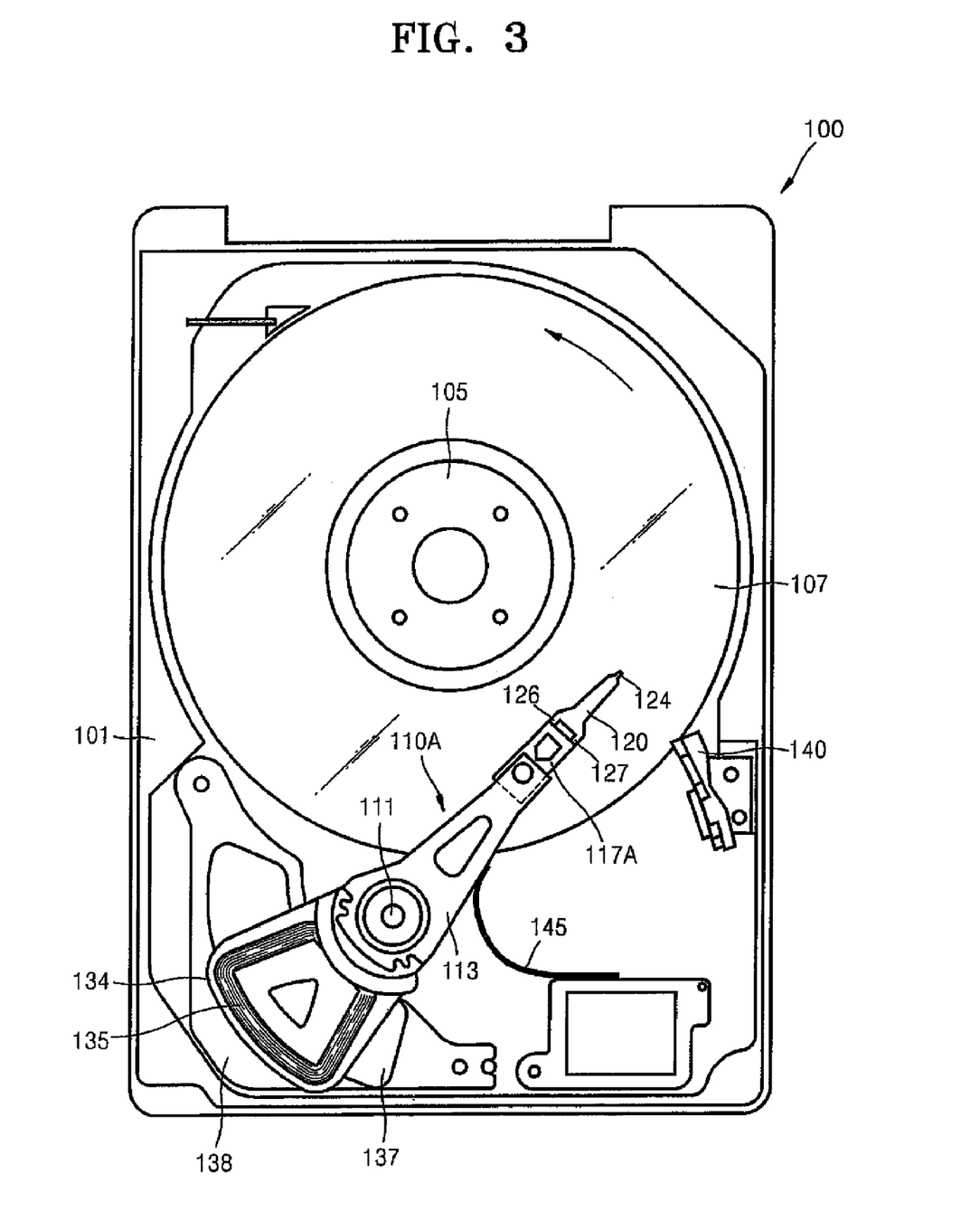
FIG. 3 is a plan view illustrating a HDD in accordance with one embodiment of the invention.
Figure 4:
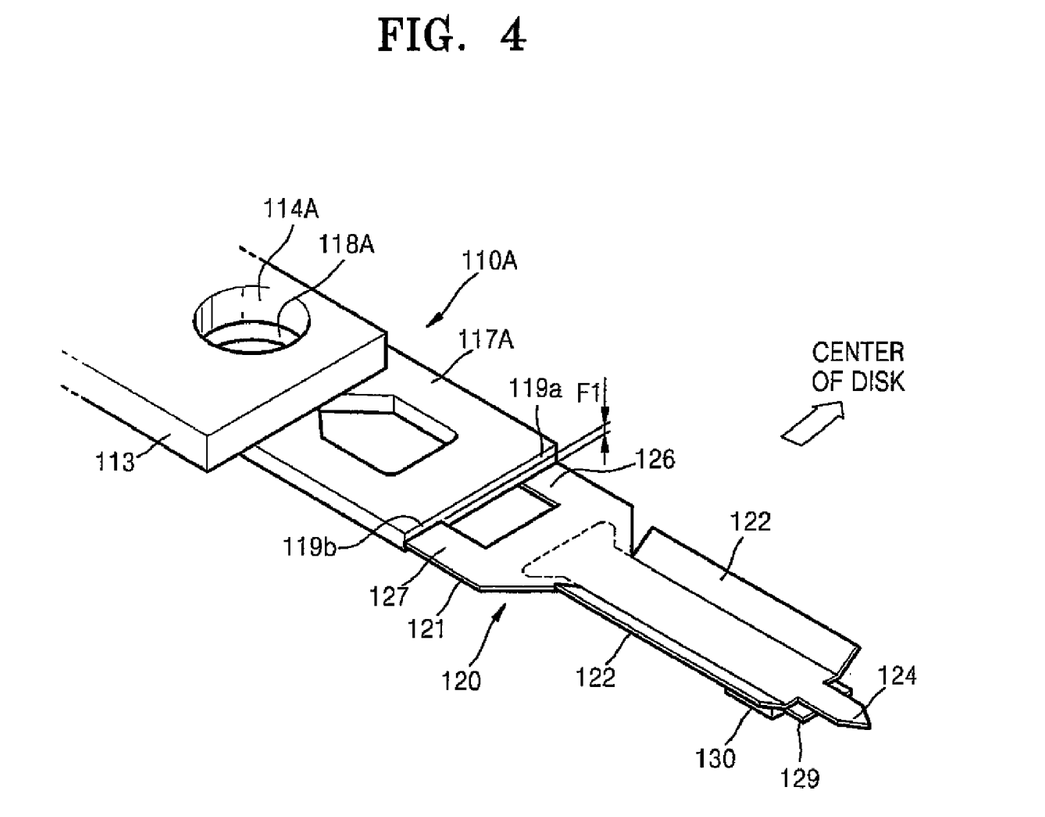
FIGS. 4 and 5 are a perspective view and a plan view illustrating a HSA in accordance with an embodiment of the invention.
Figure 5:
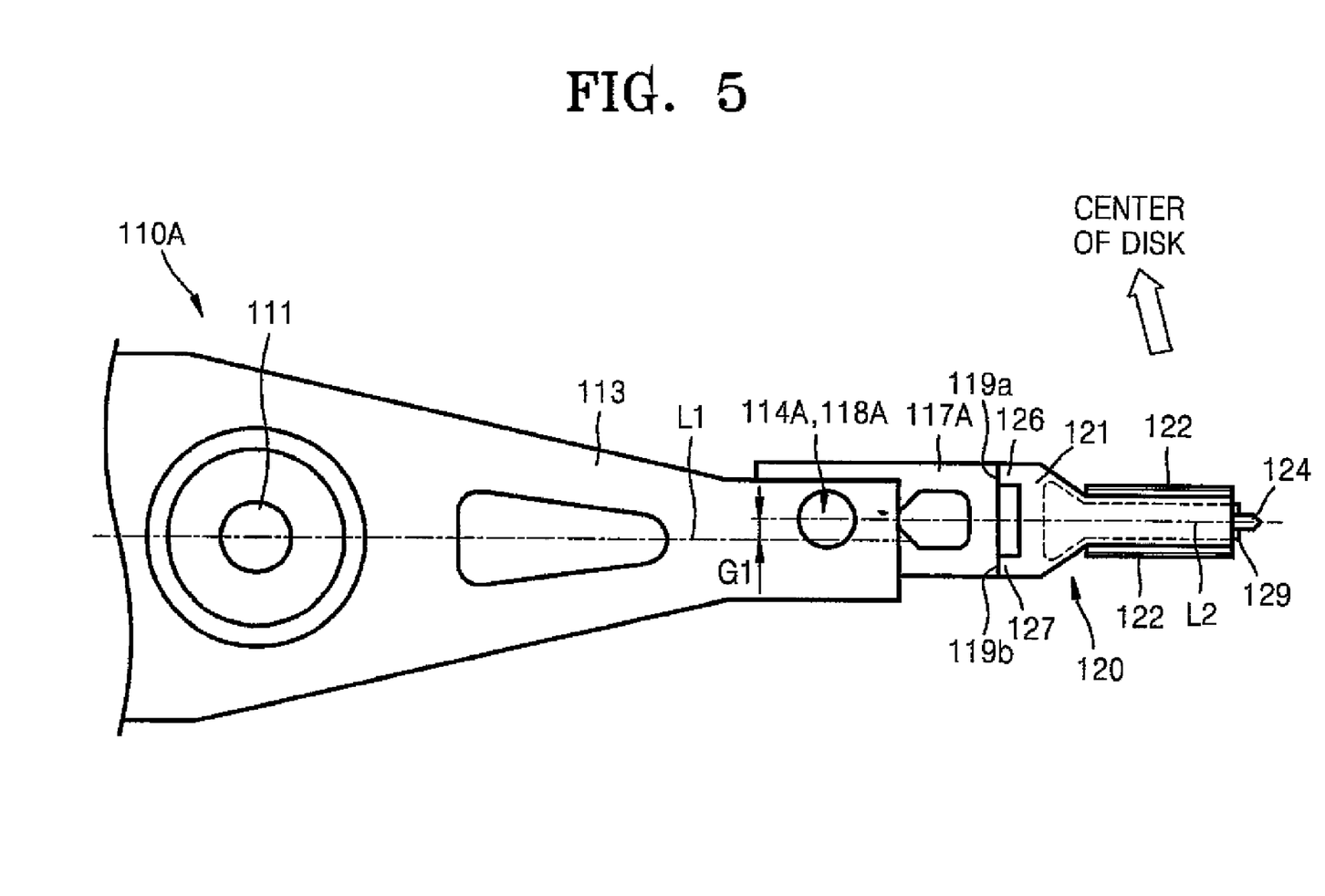
Figure 6:
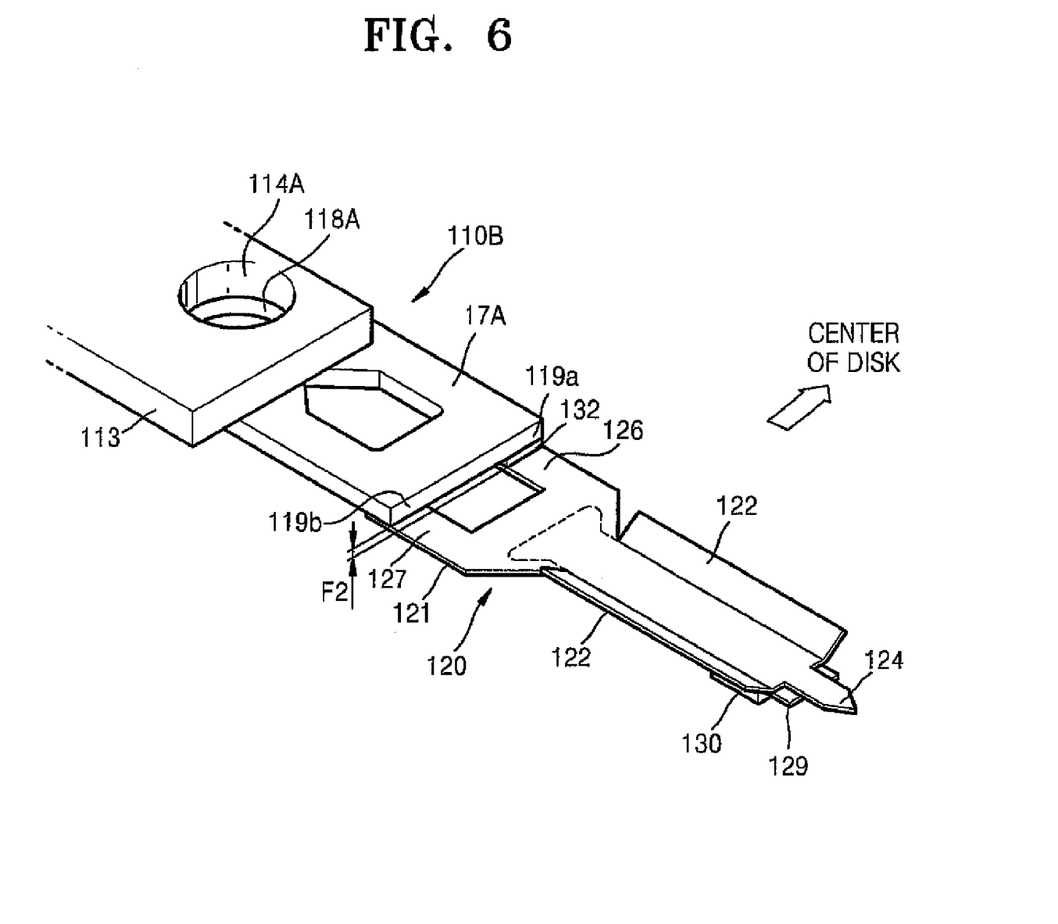
FIG. 6 is a perspective view illustrating a HSA in accordance with another embodiment of the invention.
Figure 7:
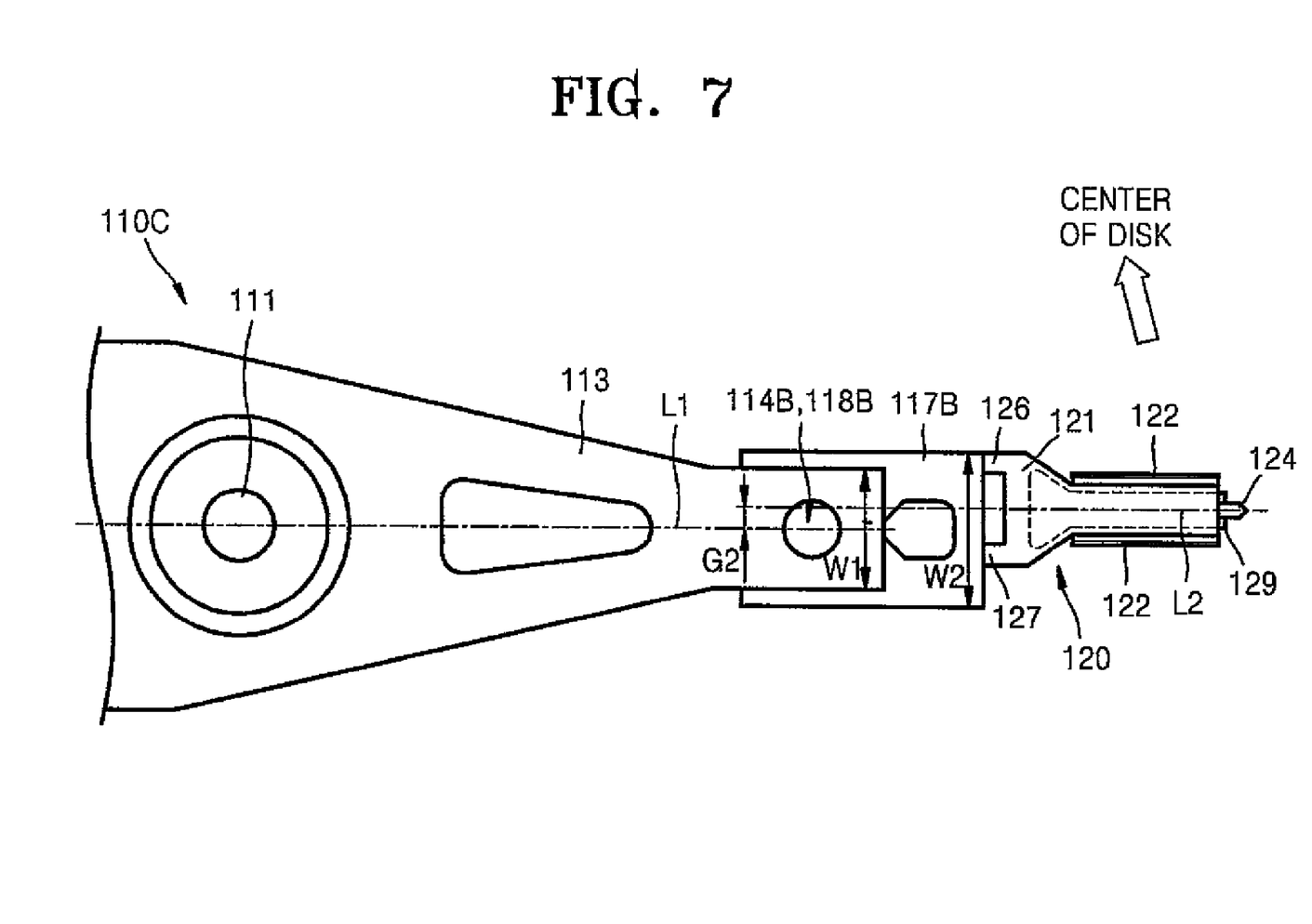
FIG. 7 is a perspective view illustrating a HSA in accordance with another embodiment of the invention.

FIG. 3 is a plan view of a HDD 100 according to an embodiment of the invention. FIGS. 4 and 5 are a perspective view and a plan view showing a close-up of a HSA 110A in accordance with an embodiment of the invention; FIG. 6 is a perspective view showing a close-up of a HSA 110B according to another embodiment of the invention; and FIG. 7 is a perspective view showing a close-up of a HSA 110C in accordance with another embodiment of the invention.

Referring to FIGS. 3 through 5, HDD 100 comprises a spindle motor 105, a disk platter 107 used as a data storage medium, and HSA 110A. Spindle motor 105, disk platter 107, and HSA 110A are located in a housing comprising a base member 101 and a cover member (not shown) coupled to base member 101. Spindle motor 105 rotates disk platter 107 at a high speed in a direction indicated by an arrow and is fixed to base member 101. The high-speed rotation of disk platter 107 generates air flow in the direction of the arrow.

HSA 110A comprises a head slider 130 (See, FIG. 4) comprising an embedded magnetic head used to read and write data in disk platter 107. Head slider 130 moves to a selected track of disk platter 107 to write or read data to/from disk platter 107. HSA 110A comprises a swing arm 113 rotatably coupled to base member 101 by a pivot bearing 111, a connection plate 117A assembled with an edge part of swing arm 113, a head suspension component 120 attached to connection plate 117A, and head slider 130 attached to the edge part of head suspension component 120. HSA 110A further comprises an overmold 134 comprising a wound voice coil 135. Overmold 134 is coupled to swing arm 113.

A magnet 137 and a yoke 138 supporting magnet 137 are respectively located above and below overmold 134. Magnet 137, yoke 138, and voice coil 135 of HSA 110A form a voice coil motor and provide a driving force for rotating HSA 110A.

When the air flow induced by the high-speed rotation of disk platter 107 passes between disk platter 107 and head slider 130, lift is exerted on head slider 130. Accordingly, head slider 130 floats at a height where the lift is balanced with elastic pressure pressing head suspension component 120 and head slider 130 toward disk platter 107. While floating, magnetic head embedded in head slider 130 writes and reads data to/from disk platter 107.

HDD 100 further comprises a flexible printed circuit (FPC) 145, electrically connecting HSA 110A to a main printed circuit board (PCB) (not shown) below base member 101, and a ramp 140 for parking HSA 110A when HDD 100 is not operating. To park, HSA 110A rotates clockwise so that head slider 130 moves away from disk platter 107, and an end-tap 124 located on the edge part of head suspension component 120 slides along a slope of ramp 140 to place HSA 110A in a safety zone where HSA 110A maintains a fixed state.

Connection plate 117A of HSA 110A connects the edge part of swing arm 113 to head suspension component 120. The edge part of swing arm 113 is assembled with connection plate 117A by swaging. The edge part of swing arm 113 and connection plate 117A respectively comprise swaging holes 114A and 118A for the swaging assembly.

Head suspension component 120 comprises a load beam 121 attached to connection plate 117A and a flexure 129 attached to load beam 121. Load beam 121 elastically biases head slider 130 towards the surface of disk platter 107 and flexure 129 supports head slider 130 on the surface of HSA 110A facing disk planter 107. End-tap 124 is formed at an edge part of load beam 121, and side-rails 122 are formed on sides of load beam 121 to maintain the stiffness of load beam 121.

Load beam 121 comprises first and second combination parts 126 and 127 attached to connection plate 117A. First combination part 126 is attached to a first corner 119a of connection plate 117A located relatively closer to the center of disk platter 107, and second combination part 127 is attached to a second corner 119b of connection plate 117A located relatively further from the center of disk platter 107. As illustrated in FIG. 4, first combination part 126 is attached to connection plate 117A at a lower position than second combination part 127. The position of first combination part 126 is lower than the position of second combination part 127 by height difference F1. Height difference F1 is less than or equal to the thickness of connection plate 117A. Height difference F1 is typically between 0 and 0.5 mm.

Referring to FIG. 6, HSA 110B is similar to HSA 110A, except that HSA 110B further comprises a spacer 132 located between first combination part 126 and the lower surface of connection plate 117A. The presence of spacer 132 increases the relative height difference between first and second combination parts 126 and 127 from height difference F1 to height difference F2. Spacer 132 is attached to the lower surface of first corner 119a of connection plate 117A, first combination part 126 is attached to the lower surface of spacer 132, and second combination part 127 is attached to the lower surface of second corner 119b of connection plate 117A.

Although not shown in the drawings, the height difference between first and second combination parts 126 and 127 of head suspension component 120 attached to the upper surface of connection plate 117A could be further modified by placing another spacer 132 between second combination part 127 and connection plate 117A. In addition, although not shown, an additional combination part could also be placed between first and second combination parts 126 and 127.

Referring again to FIGS. 3 through 5, connection plate 117A is attached to the edge part of swing arm 113 with a bias towards the center of disk platter 107. For instance, it can be seen in FIG. 4 that connection plate is slightly off center to the right relative to the longitudinal center axis of swing arm 113.

More particularly, as illustrated in FIG. 5, a longitudinal center axis of head suspension component 120 denoted by a center line L2 is offset from a longitudinal center axis of swing arm 113 denoted by a center line L1. As seen in FIG. 5, lines L1 and L2 are separated by a gap G1. Gap G1 typically has a small magnitude between 0 and 2 mm to allow connection plate 117A swing arm 113 to remain bonded to each other. The respective centers of swaging holes 114A and 118A are located along line L2 but not along line L1.

Referring to FIG. 7, HSA 110C is similar to HSA 110A, except that in HSA 110C, a connection plate 117B is substituted for connection plate 117A and swaging holes 114B and 118B are substituted for swaging holes 114A and 118A. Connection plate 117B has a width W2 greater than a width W1 of the edge part of swing arm 113. Head suspension component 120 is attached to an edge part of connection plate 117B and biased towards the center of disk platter 107. Thus center line L2 of head suspension component 120 is parallel to center line L1 of swing arm 113 but separated by a gap G2.

Unlike connection plate 117A in HSA 110A, connection plate 117B is substantially centered with respect to the edge part of swing arm 113. As a result, the respective centers of swaging holes 114B and 118B are located along center line L1 of swing arm 113.

Figure 8:
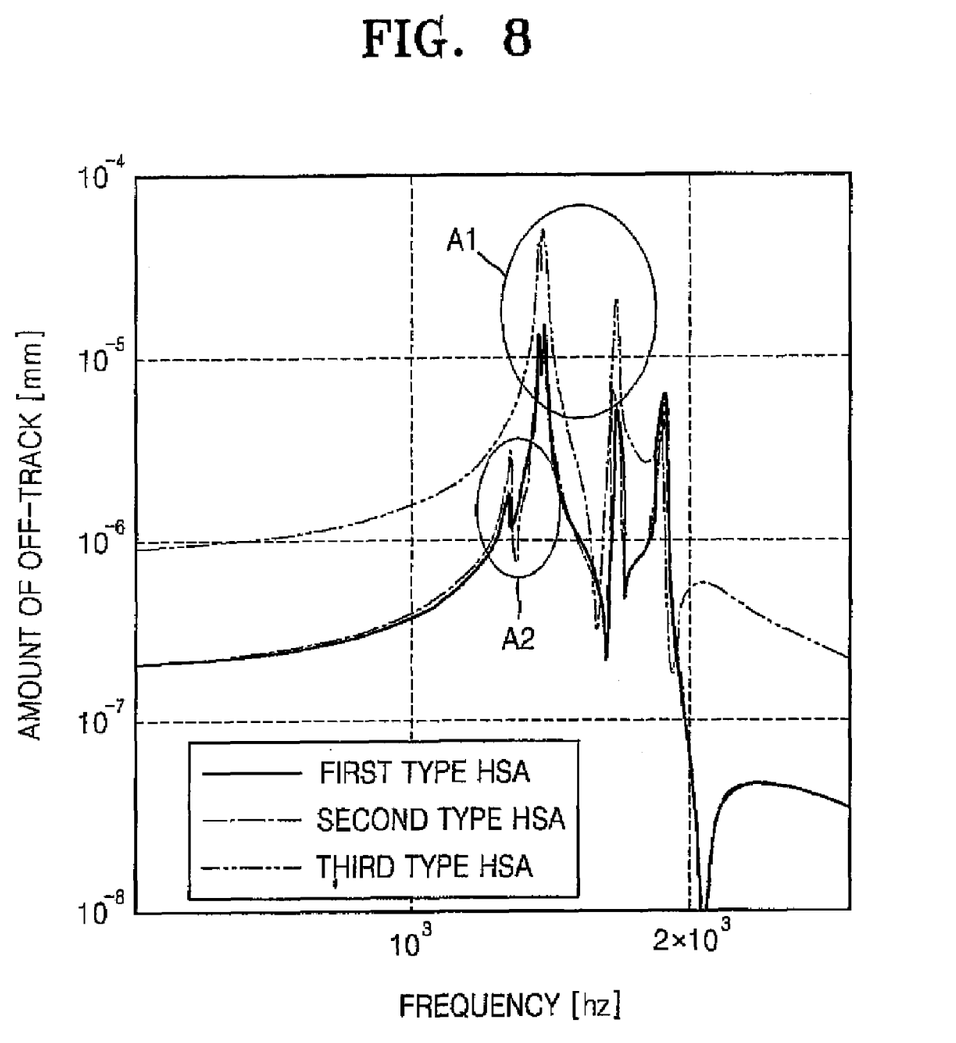
FIG. 8 is a graph illustrating a correlation between the frequency of disk vibrations or arm bending applied to the HDD of FIG. 3 and an amount of off-track displacement in the HDD.
Figure 9:
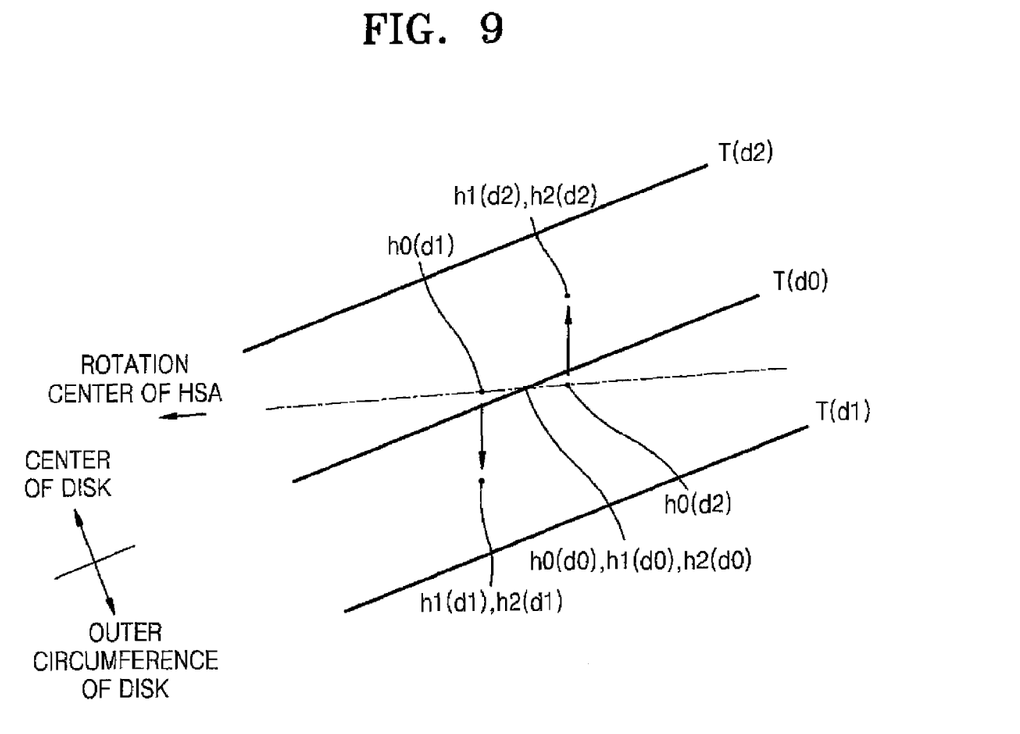
FIG. 9 is a schematic diagram used to illustrate a reduction in off-track displacement due to disk vibrations in an HSA in accordance with an embodiment of the invention.
Figure 10:
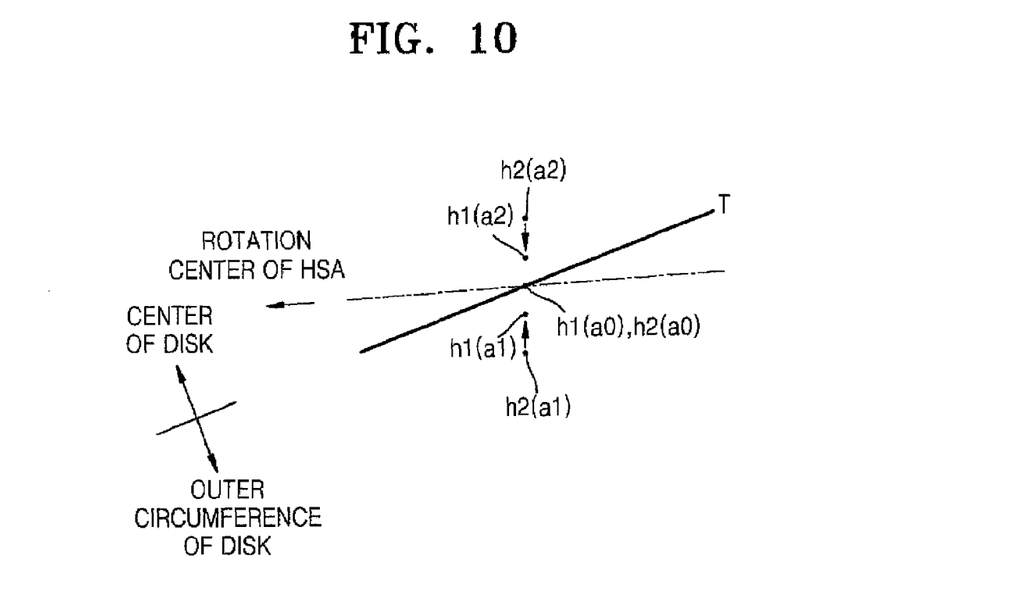
FIG. 10 is a schematic diagram used to illustrate a reduction in off-track displacement due to arm bending in an HSA in accordance with an embodiment of the invention.

FIG. 8 is a graph illustrating a correlation between the frequency of vibrations applied to an HDD such as that illustrated in FIG. 3 and the amount of off-track displacement in the HDD. FIG. 9 is a schematic diagram for describing an effect of reducing off-track displacement due to disk vibration in an HSA according to an embodiment of the present invention. FIG. 10 is a schematic diagram for describing an effect of reducing the off-track displacement due to arm bending in an HSA according to an embodiment of the present invention.

In order to verify the performance of selected embodiments of the invention, the inventor analyzed the amount of off-track displacement at various frequencies using a computer simulation of an HSA (e.g., such as that illustrated in FIGS. 3 through 5) having both a first characteristic in which first combination part 126 is attached to connection plate 117A in a lower position than second combination part 127, and a second characteristic in which the connection plate 117A is assembled with swing arm 113 so as to be biased towards the center of disk 107 (hereinafter, a first type HSA); an HSA having only the first characteristic (hereinafter, a second type HSA); and a conventional HSA having neither the first characteristic nor the second characteristic (hereinafter, a third type HSA). In the computer simulation, it was assumed that the HDD has a 2.5-inch diameter disk and the height difference F1 of the first characteristic is 0.1 mm.

Referring to FIG. 8, peaks formed in an A1 zone indicate the occurrence of the off-track displacement due to disk vibration, and a peak formed in an A2 zone indicates the occurrence of the off-track due to arm bending. Table 1 shows an analysis of the data in FIG. 8.

TABLE 1

|  | Peak amount of off-track displacement due to disk vibration [×10$^{-6}$ mm] | Peak amount of off-track displacement due to arm bending [×10$^{-6}$ mm] |
| --- | --- | --- |
| First type HSA | 12.80 | 1.69 |
| Second type HSA | 12.47 | 3.09 |
| Third type HSA | 44.29 | |

As illustrated in FIG. 8 and Table 1, the first and second type HSAs having the first characteristic have roughly ¼ the amount of off-track displacement due to disk vibration than the third type HSA. In addition, the first type HSA having both the first characteristic and the second characteristic has roughly ½ the amount of off-track displacement due to arm bending than the second type HSA.

Referring to FIG. 9, when a disk (e.g., disk platter 107 of FIG. 3) vibrates up and down, then when the disk moves downwards, a track formed on a concentric circle around the center of the disk moves towards the outer circumference of the disk (from T(d0) to T(d1)), and when the disk moves upwards, the track moves towards the center of the disk (from T(d0) to T(d2)). Also, when the disk moves downwards, a magnetic head embedded in a head slider of the third type HSA moves towards the center of the HSA, i.e. the center of a pivot bearing (e.g., pivot bearing 111 of FIG. 3), (from h0(d0) to h0(d1)), resulting in off-track displacement due to a distance gap between the magnetic head and the track (between h0(d0) and T(d1)). In addition, when the disk moves upwards, the magnetic head moves away from the center of the HSA (from h0(d0) to h0(d2)), resulting in off-track due to a distance gap between the magnetic head and the track (between h0(d2) and T(d2)).

However, in the first type HSA or the second type HSA having the first characteristic, since distortion of a suspension (referring to reference numeral 120 of FIG. 3) is induced when the HSA vibrates up and down, if the disk moves downwards, a magnetic head embedded in a head slider of the HSA moves to the rotation center of the HSA and is biased towards the outer circumference of the disk (from h1(d0) or h2(d0) to h1(d1) or h2(d1)), and if the disk moves upwards, the magnetic head moves in the opposite direction (from h1(d0) or h2(d0) to h1(d2) or h2(d2)). Thus, the distance between the magnetic head and the track (i.e. between h1(d1) and T(d1) or h1(d2) and T(d2) or h2(d1) and T(d1) or h2(d2) and T(d2)) is shorter than that with the third type HSA, showing that the off-track displacement due to disk vibration is reduced.

Referring to FIG. 10, if arm bending in which an edge part of a swing arm bends upwards occurs in the second type HSA, a magnetic head moves towards the outer circumference of a disk (from h2(a0) to h2(a1)) due to distortion of the suspension caused by the first characteristic, and if arm bending in which the edge part of the swing arm bends downwards occurs in the second type HSA, the magnetic head moves towards the center of the disk (from h2(a0) to h2(a2)). Thus, the distance between the magnetic head and a track (i.e. between h2(a1) and T or h2(a2) and T) increases, resulting in off-track displacement due to arm bending.

However, if arm bending in which an edge part of a swing arm bends upwards occurs in the first type HSA, the second characteristic compensates for the motion of a magnetic head towards the outer circumference of a disk caused by the first characteristic. Thus, compared to the magnetic head of the second type HSA, the magnetic head of the first type HSA deviates from track T by a smaller amount when the arm bending occurs (from h1(a0) to h1(a1) or from h1(a0) to h1(a2)). Thus, the distance between the magnetic head of the first type HSA and the track (i.e. between h1(a1) and T or h1(a2) and T) is shorter than that in the second type HSA (i.e. between h2(a1) and T or h2(a2) and T). This shows that the off-track displacement due to arm bending is less in the first type HSA according to the present invention, compared with the second type HSA.

By reducing off-track displacement in a HSA using techniques such as those described above, the performance of a HDD including the HSA can be improved. In particular, the track following performance of a magnetic head in the HSA can be improved, and the amount of Positioning Error Signal (PES) produced by the HSA can be reduced. As a consequence, the data processing speed of the HDD will tend to increase, and the HDD can use a disk platter with higher data density as measured in tracks per inch (TPI).

The foregoing exemplary embodiments are teaching examples. Those of ordinary skill in the art will understand that various changes in form and details may be made to the exemplary embodiments without departing from the scope of the invention as defined by the following claims.

What is claimed:

1. A head stack assembly (HSA) for a hard disk drive (HDD), comprising:
   a swing arm rotatably coupled to a base member of the HDD;
   a connection plate coupled to an edge part of the swing arm, wherein the connection plate is biased towards the center of a disk platter of the HDD relative to the edge part of the swing arm;
   a head suspension component comprising first and second combination parts attached to the connection plate, wherein the first combination part is closer to the center of the disk platter than the second combination part and is attached to the connection plate in a first position, and the second combination part is attached to the connection plate in a second position higher than the first position, wherein the head suspension further comprises a spacer disposed between at least one of the first and second combination parts and the connection plate to augment a height difference between the first and second combination parts; and
   a head slider comprising a magnetic read/write head and attached to an edge part of the head suspension component.

2. The HSA of claim 1, wherein a longitudinal center axis of the head suspension component is substantially parallel with but not substantially co-linear with a longitudinal center axis of the swing arm.

3. The HSA of claim 1, wherein the head suspension component comprises:
   a load beam comprising the plurality of combination parts and elastically biasing the head slider towards a surface of the disk platter; and
   a flexure supporting the head slider.

4. A hard disk drive (HDD) comprising a base member, a disk platter used as a data storage medium and adapted to rotate on the base member at a high speed, and a head stack assembly (HSA) rotatably coupled to the base member and used to write and read data to/from the disk platter, the HSA comprising:
   a swing arm rotatably coupled to the base member;
   a connection plate coupled to an edge part of the swing arm, wherein the connection plate is biased towards the center of the disk platter relative to the edge part of the swing arm;
   a head suspension component comprising first and second combination parts attached to the connection plate, wherein the first combination part is closer to the center of the disk platter than the second combination part and is attached to the connection plate in a first position, and the second combination part is attached to the connection plate in a second position higher than the first position, wherein the head suspension further comprises a spacer disposed between at least one of the first and second combination parts and the connection plate to augment a height difference between the first and second combination parts; and
   a head slider comprising a magnetic read/write head and attached to an edge part of the head suspension component.

5. The HDD of claim 4, wherein a longitudinal center axis of the head suspension component is substantially parallel with but not substantially co-linear with a longitudinal center axis of the swing arm.

6. The HDD of claim 4, wherein the head suspension component comprises:
   a load beam comprising the plurality of combination parts and elastically biasing the head slider towards a surface of the disk platter; and
   a flexure supporting the head slider.

7. A head stack assembly (HSA), comprising:
   a swing arm rotatably coupled to a base member of a hard disk drive (HDD);
   a connection plate coupled to an edge part of the swing arm;
   a head suspension component biased toward the center of the disk platter and comprising first and second combination parts attached to the connection plate, wherein the first combination part is closer to the center of a disk platter of the HDD than the second combination part and is attached to the connection plate in a first position, and the second combination part is attached to the connection plate in a second position higher than the first position, wherein the head suspension further comprises a spacer disposed between at least one of the first and second combination parts and the connection plate to augment a height difference between the first and second combination parts; and
   a head slider comprising a magnetic read/write head and attached to an edge part of the head suspension component.

8. The HSA of claim 7, wherein a longitudinal center axis of the head suspension component is substantially parallel with, but is closer to the center of the disk platter than a longitudinal center axis of the swing arm.

9. A hard disk drive (HDD) comprising a base member, a disk platter used as a data storage medium and adapted to rotate on the base member at a high speed, and a head stack assembly (HSA) rotatably coupled to the base member and used to write and read data to/from the disk platter, the HSA comprising:

a swing arm rotatably coupled to the base member;

a connection plate coupled to an edge part of the swing arm;

a head suspension component biased toward the center of the disk platter and comprising first and second combination parts attached to the connection plate, wherein the first combination part is closer to the center of the disk platter than the second combination part and is attached to the connection plate in a first position, and the second combination part is attached to the connection plate in a second position higher than the first position, wherein the head suspension further comprises a spacer disposed between at least one of the first and second combination parts and the connection plate to augment a height difference between the first and second combination parts; and a head slider comprising a magnetic read/write head and attached to an edge part of the head suspension component.

10. The HDD of claim 9, wherein a longitudinal center axis of the head suspension component is substantially parallel with, but is closer to the center of the disk platter than a longitudinal center axis of the swing arm.

* * * * *